(12) United States Patent
Olukoju

(10) Patent No.: US 10,859,298 B2
(45) Date of Patent: Dec. 8, 2020

(54) EVAPORATOR CONTROL

(71) Applicant: Hubbard Products Ltd, Suffolk (GB)

(72) Inventor: Sam Olukoju, Otley (GB)

(73) Assignee: Hubbard Products Ltd, Ipswich (GB)

( * ) Notice: Subject to any disclaimer, the term of this patent is extended or adjusted under 35 U.S.C. 154(b) by 717 days.

(21) Appl. No.: 15/104,039

(22) PCT Filed: Dec. 19, 2014

(86) PCT No.: PCT/GB2014/053811
§ 371 (c)(1),
(2) Date: Jun. 13, 2016

(87) PCT Pub. No.: WO2015/092439
PCT Pub. Date: Jun. 25, 2015

(65) Prior Publication Data
US 2017/0030622 A1     Feb. 2, 2017

(30) Foreign Application Priority Data

Dec. 20, 2013  (GB) .................................. 1322807.7

(51) Int. Cl.
*F25B 49/02* (2006.01)
*G05B 15/02* (2006.01)
(Continued)

(52) U.S. Cl.
CPC .............. *F25B 49/02* (2013.01); *F25B 5/02* (2013.01); *F25B 39/02* (2013.01); *G05B 15/02* (2013.01);
(Continued)

(58) Field of Classification Search
CPC ............ G05B 39/02; G05B 2219/2654; G05B 2219/41181; G05B 15/02; F25B 49/02;
(Continued)

(56) References Cited

U.S. PATENT DOCUMENTS 2,332,981 A   10/1943  Anderson
5,743,098 A    4/1998  Behr
(Continued)

FOREIGN PATENT DOCUMENTS

EP         1087186 A2    3/2001

OTHER PUBLICATIONS

The International Searching Authority, International Search Report (ISR) and Written Opinion for International Application No. PCT/GB2014/053811, dated Mar. 10, 2015, 8 pages, European Patent Office, The Netherlands.

*Primary Examiner* — Steve S Tanenbaum
(74) *Attorney, Agent, or Firm* — Alston & Bird LLP

(57) ABSTRACT

An evaporator controller for a plural-coil evaporator of a refrigeration system, the evaporator controller comprising a mode determiner for selecting a mode of operation of the evaporator from a plurality of modes of operation, wherein one mode uses a first coil of the plurality of coils of the evaporator, another mode uses a second coil of the plurality of coils of the evaporator and at least one mode uses more than one of the plurality of coils, based on selection data and a refrigeration requirement, and a selection data updater for updating the selection data based on the selected mode of operation and a process variable of the refrigeration system.

37 Claims, 6 Drawing Sheets

(51) Int. Cl.
*F25B 5/02* (2006.01)
*F25B 39/02* (2006.01)

(52) U.S. Cl.
CPC ............... *F25B 2600/2513* (2013.01); *F25B 2700/21173* (2013.01); *G05B 2219/2654* (2013.01); *G05B 2219/41181* (2013.01)

(58) Field of Classification Search
CPC ............... F25B 5/05; F25B 2600/2513; F25B 2700/21173; F25B 39/02; F25B 5/02; F25D 11/022
USPC .......................................... 62/155, 234, 129
See application file for complete search history.

(56) References Cited

U.S. PATENT DOCUMENTS

| | | | |
|---|---|---|---|
| 5,749,238 A * | 5/1998 | Schmidt | F25B 5/02 62/211 |
| 6,212,894 B1 * | 4/2001 | Brown | F24D 19/1054 236/20 R |
| 6,715,304 B1 | 4/2004 | Wycoff | |
| 9,733,009 B2 * | 8/2017 | Lee | F25B 5/02 |
| 2001/0017037 A1 * | 8/2001 | Martin | F25B 49/02 62/216 |
| 2001/0054293 A1 * | 12/2001 | Gustafson | F25B 49/02 62/183 |
| 2007/0137226 A1 | 6/2007 | Kim et al. | |
| 2007/0151289 A1 | 7/2007 | Youn et al. | |
| 2007/0227168 A1 * | 10/2007 | Simmons | H05K 7/20681 62/229 |
| 2008/0104982 A1 * | 5/2008 | Sunderland | F25B 49/022 62/228.1 |
| 2011/0011109 A1 | 1/2011 | Rafalovich et al. | |
| 2011/0011125 A1 * | 1/2011 | Kasahara | F25B 49/02 62/498 |
| 2011/0138825 A1 * | 6/2011 | Chen | F25B 1/10 62/115 |
| 2012/0247138 A1 * | 10/2012 | Senf, Jr. | F25B 49/02 62/191 |
| 2012/0304670 A1 * | 12/2012 | Kumar | F25B 49/022 62/61 |
| 2013/0167572 A1 * | 7/2013 | Yamashita | F25B 25/005 62/190 |

\* cited by examiner

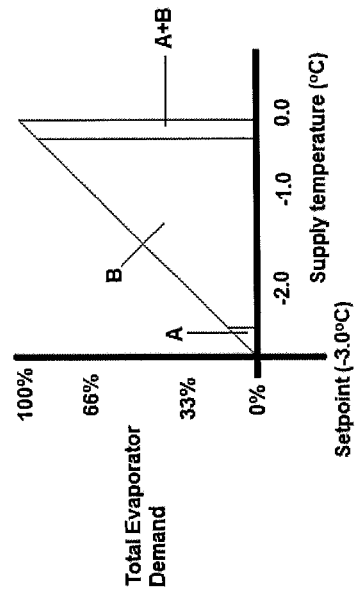
Figure 6a
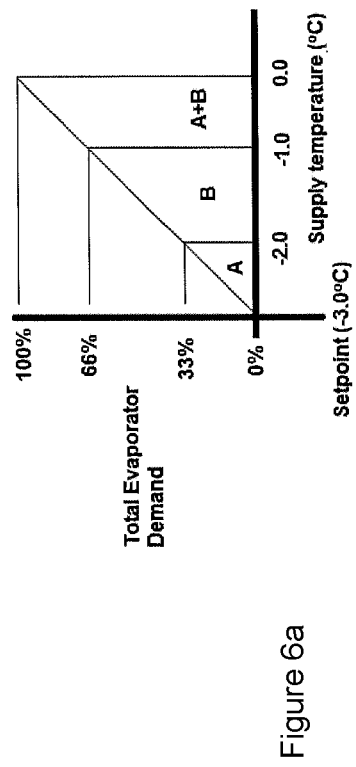
Figure 6B
Figure 6C
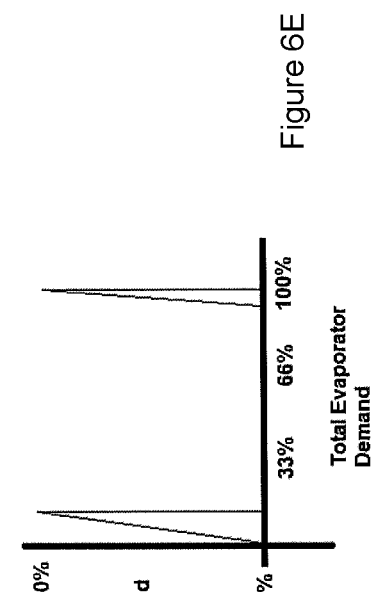
Figure 6D
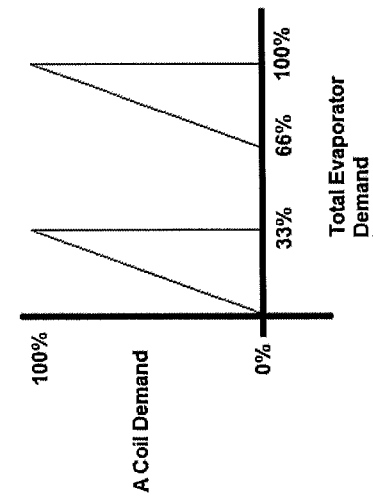
Figure 6E
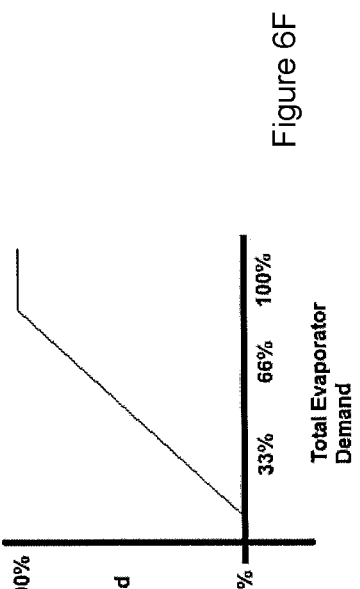
Figure 6F

EVAPORATOR CONTROL

CROSS REFERENCE TO RELATED APPLICATIONS

This application is a National Stage Application, filed under 35 U.S.C. 371, of International Application No. PCT/GB2014/053811, filed Dec. 19, 2014, which claims priority to United Kingdom Application No. 1322807.7, filed Dec. 20, 2013; the contents of both of which as are hereby incorporated by reference in their entirety.

BACKGROUND

Related Field

Brief Summary

The present invention relates to an evaporator controller for an evaporator of a refrigeration system and a method of controlling an evaporator of a refrigeration system.

A refrigeration system generally comprises a compressor, a condenser, an expansion valve and an evaporator to cool an external fluid or environment. Cooling may be provided directly an environment such as a storage compartment of commercial/domestic refrigerator, or to fluid moving in another fluid circuit such as an air conditioning system.

Such a refrigeration system may be used in an air-cooling system for chilled food display cases ("cooling cases" hereafter) such as those found on supermarket shop floors. Such an air cooling system typically comprises an air flow circuit which passes air over a cooling coil of the evaporator, provides cooled air to the cooling cases and returns warmed air back for re-cooling. Optionally, a degree of "free cooling" may be provided by mixing a proportion of ambient (external) air with the return air when the ambient air temperature is lower than that of the return air, thus placing a lower cooling demand on the evaporator.

An expansion valve of the evaporator allows control over the flow of refrigerant into the cooling coil of the evaporator. The degree of cooling provided by the evaporator depends on the amount of refrigerant released into the coil, and the rate of its release into the coil, by the expansion valve. Typically, the degree of cooling required will be that required to maintain the temperature of the external fluid (passing over the cooling coil) at, or within a defined range of, a set-point. The temperature of the external fluid directly having passed over the cooling coil may be termed the evaporator supply temperature. A measured deviation of the evaporator supply temperature from the set-point value may be corrected, or reduced, by adjusting the amount of refrigerant allowed to enter the cooling coil, or the rate at which the refrigerant is permitted to enter the cooling coil.

Finer control of the evaporator supply temperature may be made possible by providing a plurality of cooling coils each having a different capacity with, typically, each of the plurality of coils having its own expansion valve. The different in capacity could be provided, for example, by the coils having a different volumes, different refrigerant-travel distances, or different limitations on the rate of supply of refrigerant imposed by the size of the respective expansion valve.

Where, for example, two cooling coils (of different sizes) are provided, three modes of operating the evaporator are possible, namely: a first mode using the smaller coil only, a second mode using the larger coil, or a third mode using both the larger coil and the smaller coil. For each mode, all or only a portion of the maximum cooling capacity of the coil(s) in question may be used in order to provide the degree of cooling needed to achieve the desired evaporator supply temperature set-point.

Proportional direct expansion valves may be provided, in which the configuration of each expansion valve is controlled in direct proportion to a determined change in the evaporator demand, on the assumption that changing the configuration of the coil arrangement by adjusting the configuration (the valve position, that is the degree to which the valve is open) of one or more of the valves, including transitioning from one of the modes of control to another, gives rise to a corresponding, linear change in the evaporator supply temperature.

The inventors in the present case have recognised that, in fact, the evaporator supply temperature response may respond non-linearly to changes in the valve configuration and that discontinuities and other non-linear behaviour may be particularly apparent at points of transition between different modes of control. In particular, transitioning from the second mode (large coil only) to the first mode (small coil only) may give rise to a markedly non-linear or unpredictable temperature response. Such systemic non-linearity may cause unpredictable and unexpected divergence of the evaporator supply temperature from the set-point, which may provide an unpredictable degree of cooling. Moreover, where the non-linear behaviour causes the evaporator supply temperature to drop below the set-point temperature or the superheat to fall below a minimum acceptable superheat threshold, there is a risk of a backflow of refrigerant from the evaporator to the compressor, which may lead to a system shut-down procedure and may cause damage to the compressor and the surrounding area. In general, failure to take account of non-linearities may lead to temperature stability problems and capacity problems as refrigerant flows in-optimally around the refrigerator circuit.

Embodiments of the present invention address at least some of these problems.

The invention is set out in the independent claims. Some embodiments of the invention are set in the dependent claims.

BRIEF DESCRIPTION OF THE FIGURES

Embodiments of the invention will now be described with reference to the following drawings, in which:

FIG. 6 shows two examples of evaporator control regimes which may be implemented by the controller of FIG. 3 or the process of FIG. 5.

DETAILED DESCRIPTION OF VARIOUS EMBODIMENTS

Figure 1:
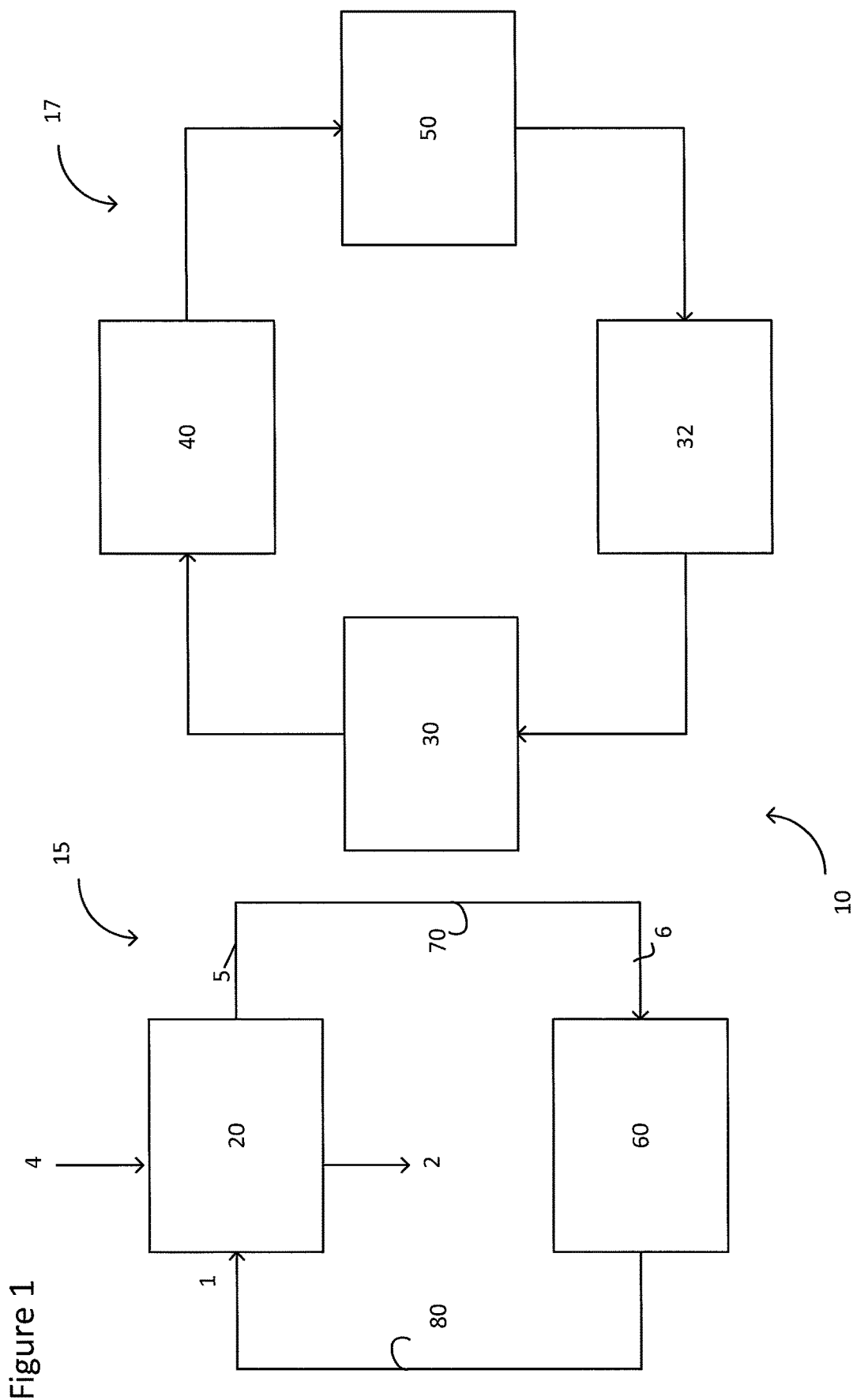
FIG. 1 shows a functional block diagram of a partial free air cooling system.

FIG. 1 shows a partial free-cooling system 10 for providing chilled air to one or more cooling cases 60, which may for example be located on a shop floor.

The partial free-cooling system 10 comprises an air flow circuit 15 and a refrigerator circuit 17.

The air flow circuit 15 comprises a mixing unit 20, a supply air path 70, the cooling cases 60, and a return air path 80.

The mixing unit 20 is arranged to provide supply air 5 into the supply air path 70, along which the supply air 5 travels so that it passes over, and is cooled by, an evaporator 30 of the refrigerator circuit 17 (described below) to provide cooled supply air 6. The cooled supply air 6 continues along the supply air path 70 to the cooling cases 60 to provide a chilled environment in the cases, for example in order to cool chilled produce stored therein. In the cooling cases 60, the air warms as it absorbs heat from the contents of the cases and the surrounding environment, and the warmed return air 1 is carried back to the mixing unit 20 along the return air path 80.

As will be described detail below, the mixing unit 20 is arranged to receive the return air 1 and optionally to receive ambient (external) air 4 and to reject unwanted return (exhaust) air 2 under the control of an air handling unit controller (not shown in FIG. 1). This enables the air flow circuit 15 to be operated in a number of different air circulation modes. For example, in a first option, return air 1 may be fully recirculated. In a second option, return air 1 may be mixed with ambient air 4 with the option of exhausting a proportion of the return air 1. In a third option, only fresh ambient air 4 is supplied to the supply air path 70. Air flow through the mixing unit 20 is shown in more detail in FIG. 2. The option selected may depend upon ambient air temperature, so that the return air is simply recirculated when the ambient temperature is higher than that of the return air and so can provide no free cooling, and the return air is partly rejected and a mixture of retained return air and ambient air is provided to the supply air path 70 when the ambient temperature is lower than that of the return air in order to provide partial free cooling. If the ambient air is cool enough to cool the cooling cases sufficiently without the need for any additional cooling by the evaporator 30, then the third option may be used in which the refrigerator circuit 15 is not utilised and no control of the evaporator is required.

As shown in FIG. 1, the refrigerant circuit 17 comprises a compressor 40, a condenser 50, an expansion valve arrangement 32 and an evaporator 30 having a cooling coil arrangement 32. A refrigerant circulates around the refrigerant circuit 17 as will be understood by those skilled in the art. In overview, the compressor 40 is arranged to receive hot low-pressure vaporized refrigerant from the evaporator 30 and to compress it to a higher pressure. The condenser 50 is arranged to receive the hot high-pressure vaporized refrigerant and to condense the refrigerant to its liquid phase, expelling heat in the process. The expansion valve arrangement 32 is arranged to receive the high-pressure liquid refrigerant and to control evaporation of the refrigerant into the cooling coil arrangement 32 of the evaporator 30. The coiling coil arrangement 32 of the evaporator 30 is in thermal communication with the supply air 5 travelling along the supply air path 70 such that the vaporized refrigerant flowing through the cooling coil arrangement 32 may absorb heat from the supply air 5 (comprising either return air 1 or a mixture of return air 1 and ambient air 4) in order to provide the cooled supply air 6 for the cases.

Control of the expansion valve arrangement 32 therefore determines how much refrigerant enters the cooling coil arrangement 32, which in turn determines the degree of cooling provided to the supply air 5 in the supply air path 70.

Figure 2:
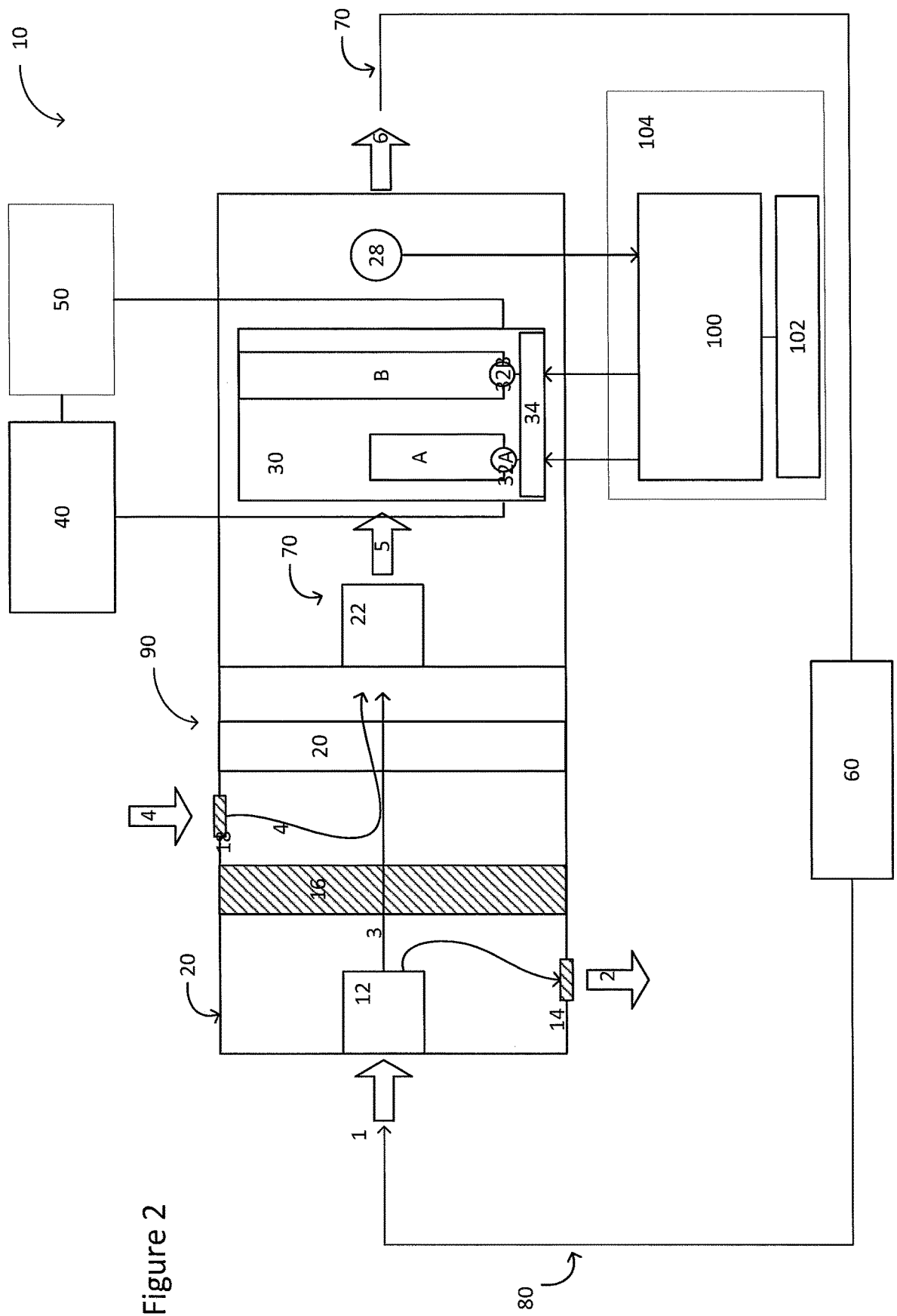
FIG. 2 shows a functional block diagram of a partial free air cooling system illustrating greater detail of a mixing unit and an evaporator of the partial free air cooling system shown in FIG. 1.

FIG. 2 shows an example of the partial air cooling system 10 of FIG. 1, showing the mixing unit 20 and the evaporator 30 in more detail. In the example shown in FIG. 2, the mixing unit 20, the expansion valve 32 and evaporator 30, and the portion of the supply air path 70 which carries supply air over the evaporator 30 are shown in a single physical unit, which is referred to hereafter as the air handling unit (AHU) 90, but it will be appreciated that the components of the air handling unit 90 could be distributed and fluidly coupled together by ducting or pipework, for example.

In addition to the components shown in FIG. 1, FIG. 2 shows the air handling unit controller (AHU controller) 104, and a user interface 102 thereof. The AHU controller 104 comprises an expansion valve controller 100. The expansion valve controller is arranged to receive a temperature sense signal T from a sensor 28 and to control operation of the expansion valve arrangement 32 based, in part, on the temperature sense signal, as described below.

Arrows 1, 2, 3, 4, 5 and 6 indicate the passage of air along the flow paths 70 and 80 through the air handling unit 90. In the example shown in FIG. 3, the arrows show that the partial free air cooling system 10 is operating in the second cooling option, in which the supply air 5 comprises a mixture of the return air 1 and ambient air 4.

As shown in FIG. 2, the mixing unit 20 comprises a return air fan 12, an exhaust damper 14, a mixing damper 16, an intake damper 18, an air filter 19 and supply air fan 22.

The return air fan 12 is provided at a first end of the mixing unit 20 to drive return air 1 from the cases into the air handling unit 90. The exhaust damper 14 is provided in a wall of the mixing unit 60/air handling unit 90 downstream of the return air fan 12 to control whether, and if so how much, return air is expelled from the supply air path 70 as exhaust air 2. The mixing damper 16—is located downstream of the exhaust air damper 14 to direct exhaust air towards the exhaust damper 14. The intake damper 18 is provided in a wall of the mixing unit 20/air handling unit 90 downstream of the mixing damper 18 to control whether, and if so how much, ambient air 4 is introduced into the supply air path 70. The air filter 19 is located downstream of the intake damper 18 to remove impurities and the like from the air flow. The supply air fan 22 is provided at a second end of the mixing unit 20, downstream of the air filter 19, to pass supply air 5 into the supply air path 70 and towards the evaporator 30.

The return air fan 12, mixing damper 16, intake damper 18, air filter 19 and supply air fan 22 have control couplings (not shown) with the AHU controller 104 to control their operation. For example, in the case of an emergency requiring rapid shutdown of the air circulation system, such as a fire, the exhaust damper 16 may be controlled to direct all return air to the exhaust damper 14. The exhaust damper 14, mixing damper 16 and intake damper 18 may be provided by respective louvers.

In operation, the AHU 104 determines, based on a measurement of ambient air temperature, that the AHU will operate in one of the three cooling modes, in this examples, the second (or partial cooling) mode.

The AHU controller sends control signals to the exhaust damper 14 to open to allow a proportion of the return air 1 to be expelled from the mixing unit 20 into the outside environment, to the mixer damper to allow a "retained" proportion 3 of the return air to pass towards the filter, and to the intake damper to allow a quantity of ambient air 4 to enter the mixing unit 20. The degree to which each of the dampers is opened may be controlled in accordance with rules stored in the AHU controller and the measurement of the ambient temperature. By controlling opening of the dampers, supply air having a desired ratio of return air to ambient air is provided to the filter, which filters impurities from the supply air and allows the filtered air to pass to the supply air fan 22, which blows the filtered supply air towards the evaporator 30 so that the supply air 5 passes over the cooling coils 32.

Operation of the return air fan 12 and supply air fan 22, including the speed of operation, is also controlled by the AHU controller 104 to ensure a desired airflow volume into and out of the mixing unit 20.

Sensor 28 is arranged to measure a temperature (the evaporator supply temperature) of the supply air 5 immediately after having passed over the cooling coils 32 and to provide a temperature sense signal T to the expansion valve controller 100.

The evaporator 30 comprises first and second cooling coils A and B which as shown are physically separate with parallel refrigerant paths. Each cooling coil is associated with a respective one of first and second expansion valves 32A, 32B of the expansion valve arrangement 32, which provide the inlet valves for the first and second cooling coils, A, B respectively. The expansion valves 32A, 32B are electronic expansion valves, for example Carel ExV expansion valves. Each expansion valve 32A, 32B has its own associated electronic valve drive circuitry 34A, 34B to control the degree of openness of the respective valve in response to control/power signals from the expansion valve controller 100 within the AHU controller 104. The first and second expansion valves 32A, 32B thus provide the inlet valves for the first and second cooling coils, A, B respectively.

Battery packs may be provided to provide a back-up power source to drive both expansion valves 32A, 32B closed in the event of power failure to avoid backflow of refrigerant to the compressor 40.

In general, digital, analogue or, where coarser control is acceptable, binary expansion valves 32 could be used with appropriate modifications the control system described herein, as will be appreciated by those skilled in the art.

The two expansion valves 32A, 32B may be unequally sized to provide two effective cooling coil sizes A, B, or the expansion valves 32A, 32B may be the same or similar while the cooling coils themselves have different capacities. In either case, the cooling capacity of the first cooling coil A is smaller than the cooling capacity of the second cooling coil B. The smaller coil may be used to provide finer control of the evaporator cooling output. In the present example, the capacity of coil A has one third of the total evaporator capacity and coil B has two thirds of the total evaporator capacity. Other ratios could be used. In other examples, more than two coils and/or expansion valves may be used, each rated at a different fraction of the total evaporator capacity, in order to provide even finer control. In general, a plurality of cooling coils and/or expansion valves could be provided. Each of the plurality expansion valves could be provided with its own valve control circuitry, or common drive control circuitry could be provided.

At any given time, possible configurations of the two expansion valves 32A, 32B are as follows: both closed; A at least partially open, B closed; A closed, B at least partially open; both A and B at least partially open. The first configuration (both closed) will only be applicable when the partial air cooling system 10 is shut down or is in the free cooling mode (first air circulation option), i.e. there is no refrigeration demand. This first configuration will therefore not be discussed further. The three remaining configurations, A only, B only, and A&B, define three modes of operation of the evaporator 30.

It will be understood that the evaporator and expansion valve control described herein could be applied to any multi-coil evaporator direct-expansion system, and that the illustrated partial air cooling system is only one example of a direct-expansion system in which the evaporator/expansion valve control described herein could be applied.

Figure 3:
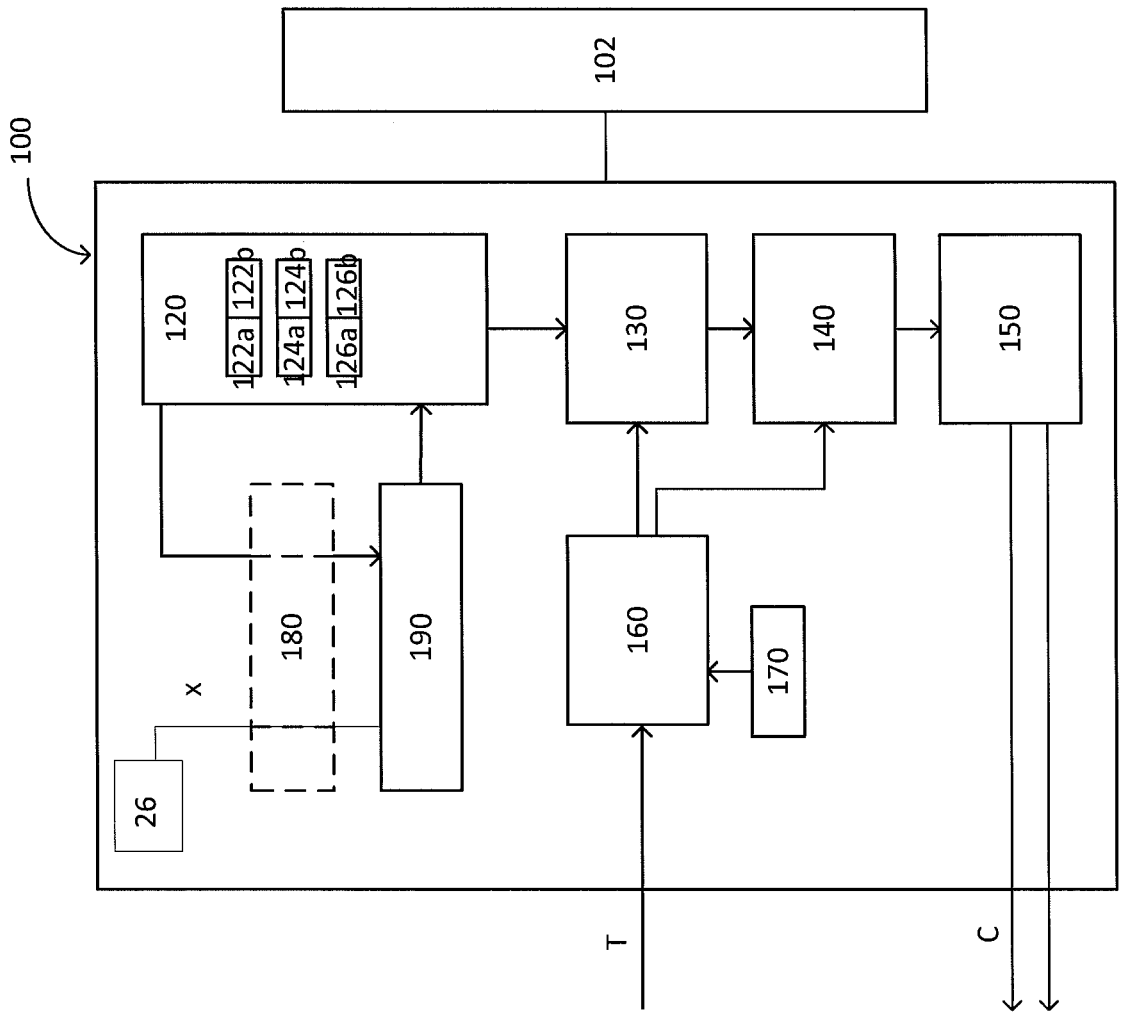
FIG. 3 is a schematic representation of an evaporator and expansion valve controller shown in FIG. 2.

FIG. 3 shows in more detail the expansion valve controller 100. Its coupling to the user interface 102 is shown schematically.

The expansion valve controller 100 comprises boundary data storage 120, a mode determiner 130, a coil usage determiner 140, a valve drive controller 150, a PID loop controller 160, set-point data storage 170, an (optional) upscaler 180, a boundary re-calculator 190 and a process variable provider 26.

The boundary data storage 120 has memory elements 122a,b 124a,b 126a,b for holding boundary data relating to operational limits of coil A, coil B and the evaporator as a whole (A&B). The expansion valve controller 100 is configured to use and manipulate this boundary data to select the correct mode of operation to modulate the evaporator supply temperature.

The user interface 102 is arranged for bidirectional communication with the expansion valve controller 100 to allow a user to view system and process information and optionally to input data, including boundary data and set-point data.

The sensor 28 is arranged to supply a temperature sense signal T representing an evaporator supply temperature to the PID loop controller 160.

The PID loop controller 160 is arranged to access an evaporator supply temperature set-point stored in the set-point data storage 170 and, based on the set-point and the temperature sense signal, to provide an output, namely an evaporator demand value (EDV), to the mode determiner 130 and to the coil usage determiner 140.

The mode determiner 130 is arranged to access boundary data stored in the boundary data storage 120 and to provide, based on the boundary data and the EDV from the PID loop controller 160, an output representing a selected mode of operation, to the coil usage determiner 140 (i.e. A only or B only or A&B).

Mode selection may be based on mode-selection rules which may be stored in the mode determiner 130 or accessed from another memory location within the AHU controller 104, or which may be supplied by a user at the user interface 102. In examples, the rules may be provided in the form of hard wired logic gates or by series of computer-readable instructions.

Because the adjacent boundaries of consecutive modes (e.g., the upper boundary of the A-only mode and the lower boundary of the B-only mode) need not necessarily share a common value, i.e. the modes could in principle have overlapping ranges, the mode-selection rules could for example dictate when to transition between modes when the evaporator supply temperature could theoretically be provided by more than one mode of operation. In examples where adjacent boundaries of consecutive modes do share a common value (e.g. upper boundary of A-only=33% total evaporator capacity, lower limit of B-only mode=33% as shown in the illustrated example in FIG. 6a), the mode-selection rules may simply dictate that a mode transition should occur whenever a boundary is encountered.

The coil usage determiner 140 is arranged to calculate a valve adjustment value for each cooling coil 32A, 32B, based the EDV received from the PID loop controller 160, the selected mode received from the mode determiner 140 and on rules, which may be stored in the coil usage determiner 140 or accessed from another location, and to output the valve adjustment values the valve drive controller 150. The valve adjustment values represent the degree to which the valve configuration (degree to which the valve is open/closed) of the respective expansion valves 32A, 32B needs to be adjusted in order to meet the evaporator demand, i.e. to meet the set-point, as calculated by the coil usage determiner 140.

The valve drive controller 150 is coupled to send control signals C to the valve drive electronics (not shown) of expansion valves 32A, 32B to control opening and closing of the valves in accordance with the valve adjustment values.

In the absence of unpredictable non-linear behaviour, this valve adjustment would give rise to an expected evaporator supply temperature, i.e. that aimed for by the mode determiner 130 and coil usage determiner 140. For example, in the case where the adjustment is aimed at achieving the set point temperature, the expected temperature will be the set-point plus or minus an accepted tolerance. However, as discussed, in practice systemic non-linearities mean that the valve adjustment will often not give rise to the evaporator supply temperature that would have been expected. That may be because the valve adjustment values, as determined by the coil usage determiner 140, may be inaccurate because the actual evaporator demand temperature does not correlate linearly with changes in valve configuration, and/or because the mode of operation, as selected by the mode determiner 130, may be inappropriate because actual (e.g. measured) transition temperatures do not correspond to the transition temperatures implied by the boundary data. Further, an unexpected drop in the evaporator supply temperature below the set-point or below a minimum acceptable superheat threshold may result in a backflow of liquid refrigerant from the evaporator to the compressor. Accordingly, the boundary re-calculator 190 is configured to provide updated boundary data based on the extant boundary data held in the boundary data storage 120 and on a measurement of a process variable, x.

The boundary re-calculator 190 may, in particular, be configured to provide updated boundary data such that transitions between the modes of control do not occur within a predefined range of the set-point, to reduce the risk of overshooting the set-point or moving outside of an acceptable superheat range, with the associated problems described above.

The boundary re-calculator 190 may be provided with pre-programmed boundary-update rules to govern updating the boundary data to move mode transitions away from the region of the set-point. Additionally or alternatively, such boundary-update rules may be provided by a user or a user may force a boundary adjustment by inputting commands and/or data at the user interface 102. In examples, the rules may be provided in the form of hard wired logic gates or by series of computer-readable instructions, for example.

As the transitions more likely to occur around the set-point are those between the B-only and the A&B modes, the boundary-update rules may, for example, dictate the upper boundary of the B-only mode and/or the lower boundary of A&B mode should be away from the set-point (i.e. to a less cold temperature) when the process variable value indicates that the evaporator supply temperature is within a predefined range of the set-point.

Boundary-selection rules could dictate, for example, that when the process variable, for example the evaporator supply temperature, is above a certain threshold, the upper A-only boundary should be raised so that a transition to the B-only mode is avoided, or that the upper B-only mode should be raised so that a transition to the A&B mode is avoided, or that the upper B-only boundary and the lower A&B boundaries should be lowered to reduce the likelihood of a transition occurring near the set-point. It will be appreciated that these are just some possibilities.

The process variable provider 26 is arranged to provide data representing the process variable x to the upscaler 180. The upscaler 180 is arranged to access the boundary data held in the boundary data storage 120 and to provide up-scaled values of the boundary data and process variable x to the boundary re-calculator 190. The up-scaled values are the input values multiplied by a scaling factor. The up-scaled boundary data may therefore have a greater apparent range compared to the raw boundary data, and this may be computationally helpful by enhancing the precision with which the process variable x may be located within the boundary data, and so reduce the likelihood that rounding errors or the like will occur during the subsequent re-calculation of the boundary data (which recalculation is based on the position within the boundary data of the process variable x).

The boundary re-calculator 190 is arranged to receive the up-scaled boundary data and up-scaled process variable x, and to update the boundary data based on the position of up-scaled process variable x within the up-scaled boundary data. The boundary (down-scaled) updated boundary data is passed to the boundary data storage 120. The boundary data storage is configured to replace the extant boundary data with the updated boundary data and to make the updated boundary data available to the mode determiner 130 for the next pass of the control loop.

(In another example, the upscaler 180 may be omitted and the boundary re-calculator may be arranged to receive unscaled inputs directly from the process variable provider 26 and the boundary data storage 120.)

The process variable provider 26 may provide data representing a rate of change of evaporator demand, a theoretical duty of the evaporator, a measured duty of the evaporator, the evaporator supply temperature, the rate of change of the evaporator supply temperature, the evaporator supply temperature measured at a transition between modes of control, a superheat value, process variables associated with the compressor 40 including the suction pressure and suction temperature or any combination of these. When the process variable is, or comprises, a superheat value or a process variable associated with the compressor, data representing the variable may be provided by a controller of the compressor 40.

The process variable is used as a basis for updating the boundary data, which defines the theoretical transition temperatures between the modes of control, in order to provide more accurate control and/or to avoid the occurrence of transitions, particularly from the large coil B to the small coil A or vice-versa, within a predefined temperature region around the set-point.

Initial or modified boundary data may be supplied by a user via the user interface 102.

Figure 4:
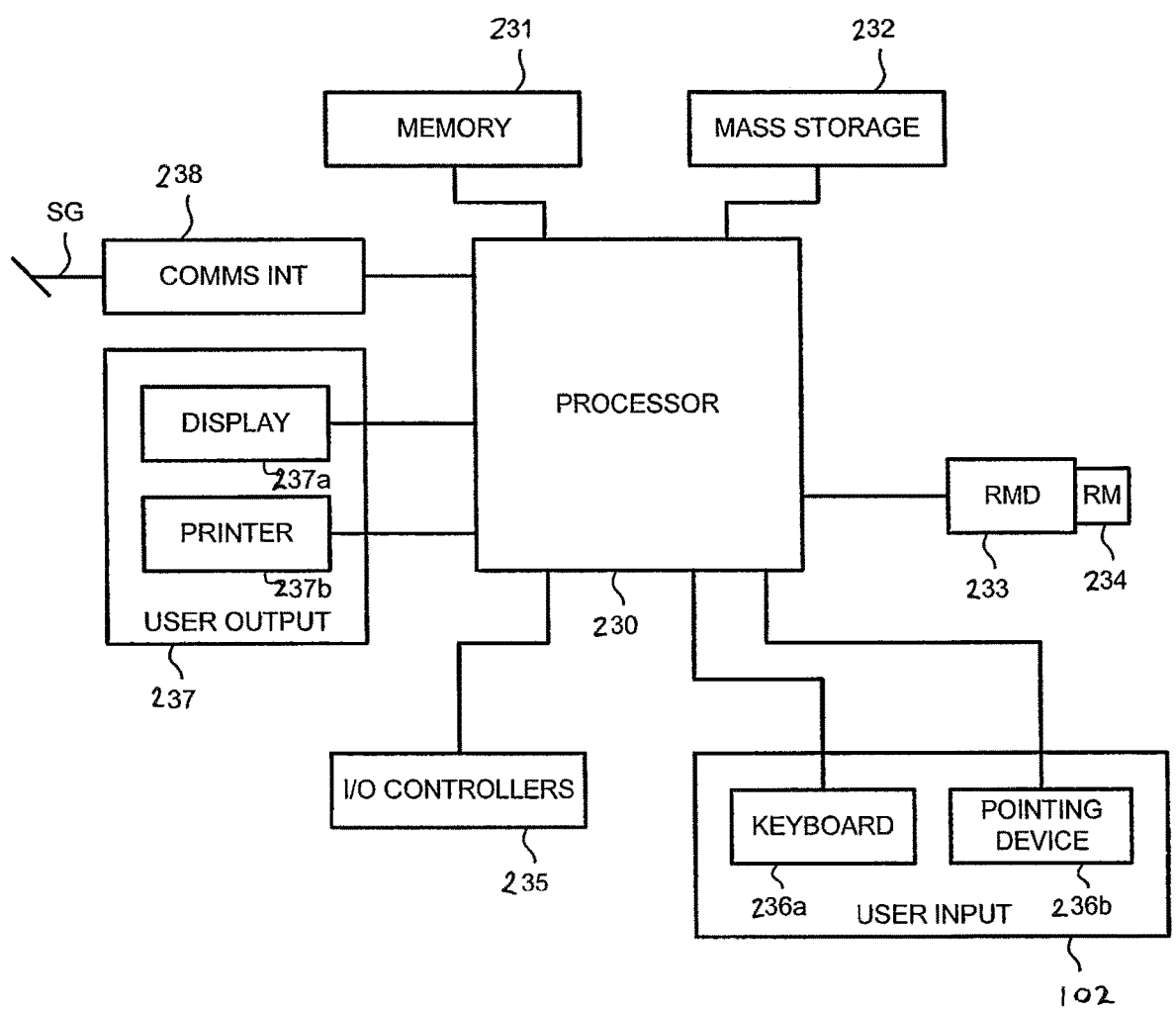
FIG. 4 is a schematic representation of computer apparatus that may be programmed by program instructions to provide the evaporator and expansion valve controller shown in FIG. 3.

At least one of the boundary data storage 120, mode determiner 130, coil usage determiner 140, valve drive controller 150, PID loop controller 160, set-point data storage 170, upscaler 180, boundary re-calculator 190 and a process variable provider 26 of the expansion valve controller 100 may be implemented by programming computing apparatus, for example a personal computer. FIG. 4 shows a simplified block diagram of such computing apparatus. As shown, the computing apparatus has a processor 225 associated with memory 226 (ROM and/or RAM), a mass storage device 227 such as a hard disk drive, a removable medium drive (RMD) 228 for receiving a removable medium (RM) 229 such as a floppy disk, CDROM, DVD or the like, input and output (I/O) controllers 237 for interfacing with expansion valves 32A, 32B to be controlled by the drive control electronics (for example) to enable the processor 225 to control operation of these components. The user interface 102 consists, in this example, of a keyboard 231a, a pointing device 231b, a display such as a CRT or LCD display 236a and a printer 236b. The computing apparatus may also include a communications interface (COMMS INT) such as a modem or network card that enables the computing apparatus to communicate with other computing apparatus over a network such as a local area network (LAN), wide area network (WAN), an Intranet or the Internet.

The processor 225 may be programmed to provide the data processor 232 and controller 21 by any one or more of the following ways: 1) by pre-installing program instructions and any associated data in a non-volatile portion of the memory 226 or on the mass storage device 227; 2) by downloading program instructions and any associated data from a removable medium 229 received within the removable medium drive 228; 3) by downloading program instructions and any associated data as a signal SG supplied from another computing apparatus via the communications interface; and 4) by user input via the user interface 102.

Figure 5:
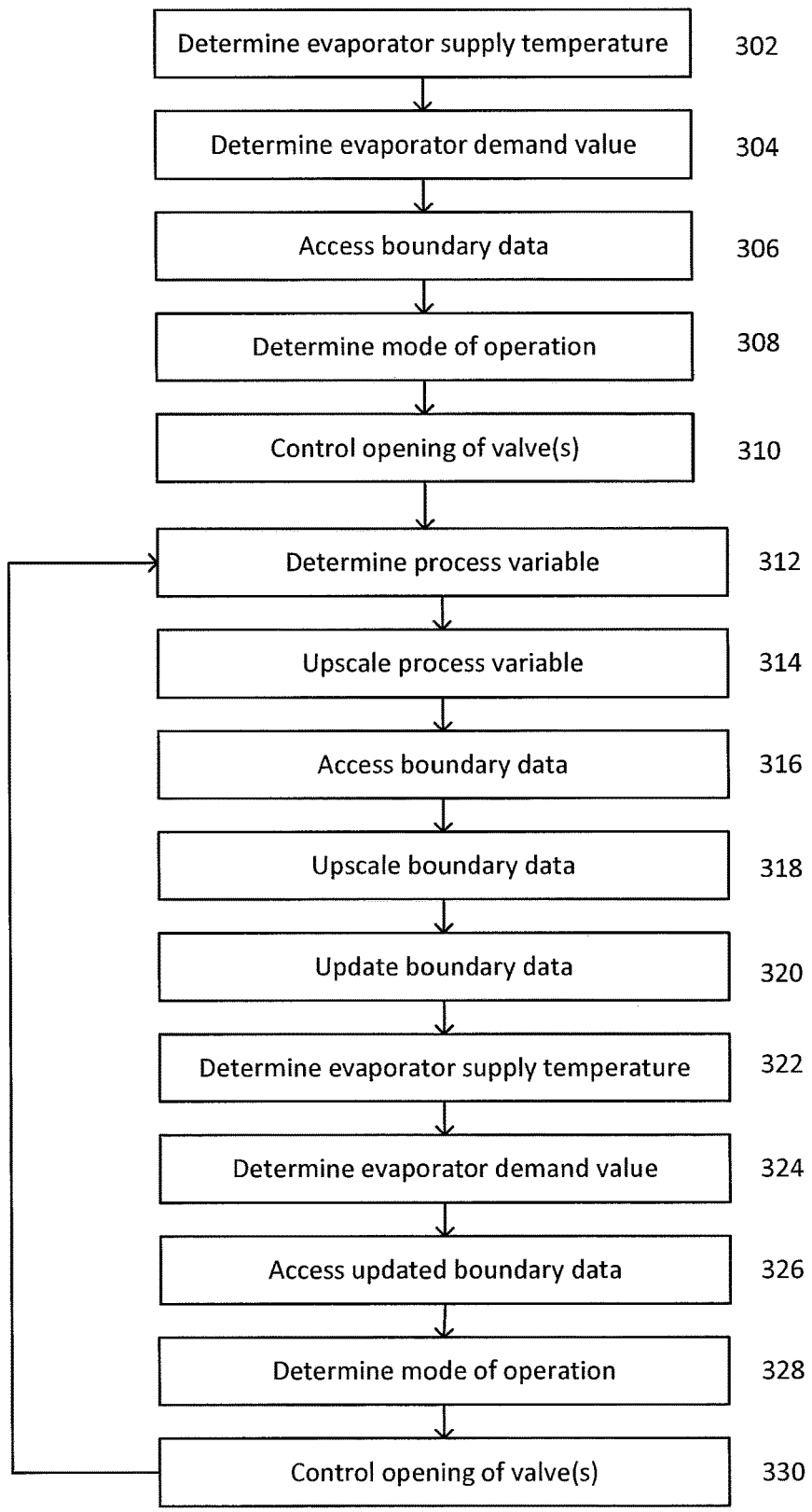
FIG. 5 shows a flow chart illustrating an evaporator control process.

FIG. 5 shows a flow chart illustrating an evaporator control process that may be implemented by the expansion valve controller 100 shown in FIG. 3.

Typically, steps 302 to 310 represent a "first pass" of a control process, which first pass uses boundary data held in the boundary data storage 120 at the start of the control cycle. This may be referred to as first boundary data. The first boundary data may be provided from memory of the AHU controller 104 or it may be input at the user interface 102.

In step 302, the sensor 28 senses the evaporator supply temperature and sends a temperature sense signal T representing the evaporator supply temperature to the PID loop controller 160. It also sends a temperature sense signal T representing the evaporator supply temperature to the coil usage determiner 140.

In step 304, the PID loop controller 160 receives the temperature sense signal T (or representation of the measured evaporator control temperature) and accesses set-point data held in the set-point data storage 170. By running PID loop control algorithms, as will be understood by those skilled in the art, taking the evaporator control temperature and the set-point value as inputs, the PID loop controller 160 calculates an evaporator demand value (EDV) representing a required adjustment in the evaporator supply.

In step 306, the mode determiner 130 receives the EDV from the PID loop controller 160 and accesses the first boundary data held in the boundary data storage 120. By comparing the EDV to the positions of the mode boundaries given by the boundary data, the mode determiner 130 selects one of the three modes of operation to be used.

Mode selection may be based on mode-selection rules which may be stored in the mode determiner 130 or accessed from another memory location within the AHU controller 104, or which may be supplied by a user at the user interface 102. Based on, for example, such mode-selection rules, the mode determiner 130 may, for example, determine that a transition to a different mode of operation should be made whenever the EDV value coincides with or crosses a mode boundary, or that a current mode of operation should be sustained despite crossing a mode boundary. It should not be necessary, at least after the first pass, for this decision to be based on factors other than the EDV, because after the first pass, other relevant factors may be reflected in the boundary values themselves, as updated by the boundary updater 190 taking account of at least one process variable. However, in other examples, the mode determiner 130 may receive other data which could be used to influence its selection of the mode of operation.

In step 310, the coil usage determiner 140 receives the an indication of the selected mode of control from the mode determiner 130 and, based on the selected mode, the evaporator supply temperature and coil usage rules, determines whether adjustment of one or both expansion valves 32A, 32B is needed to meet the evaporator demand, and generates valve adjustment values for each expansion valve 32A, 32B accordingly. The coil usage determiner 140 sends the valve adjustment values to the valve drive controller 150 which sends control signals C the cooling coil arrangement 32 to drive one or both valves to new valve configurations in accordance with the valve adjustment values. It will be appreciated that in a case where one or both valves is determined not to require adjustment, a null data adjustment value may be provided, for example.

Changing the valve configuration of one of the expansion valves 32A, 32B may include fully or partially opening the valve from a closed position, fully or partially closing the valve from an open position, or moving the valve configuration to a more open configuration or a more closed configuration when already partially open.

It will be appreciated that adjusting the configuration of the expansion valve arrangement 32 may, and would be expected to, effect a change in at least the evaporator supply temperature and possibly at least one other process variable, including for example, a measured duty of the evaporator, the rate of change of the evaporator supply temperature, the evaporator supply temperature measured at a transition between modes of control, a superheat value, process variables associated with the compressor 40 including the suction pressure and suction temperature, or any combination of these.

In step 312, the process variable is determined. This may include measurement of the evaporator supply temperature, measurement of the duty of the evaporator, calculation of a rate of change of the evaporator supply temperature, measuring the evaporator supply temperature measured where a transition between modes of control has occurred (if one has occurred), or any combination of these. In the case where the process used is the evaporator supply temperature, determining the process variable may comprise the sensor 28 sensing the (new) evaporator supply temperature and sending a temperature sense signal T representing the measured evaporator supply temperature. In general, a value representing the process variable is sent to the upscaler 180 or, in examples that do not include the upscaler 180, to the boundary re-calculator 190.

It will be understood that, in general, determining the process variable may comprise receiving a value representing the process variable from a sensor, some memory in the AHU controller or from a user input and need not necessarily comprise performing a measurement operation.

In step 314, the value representing the process variable is received at the upscaler, which up-scales the value by multiplying it by a scaling parameter. (It will be appreciated that in examples which do not include the upscaler, this step may be omitted and the value representing the process variable is received at the boundary re-calculator 190.)

In step 316, the upscaler 180 accesses the first boundary data 120 held in the boundary data storage 120. (It will be appreciated that in examples which do not include the upscaler, this step may be omitted and the boundary re-calculator 190 may instead access the first boundary data 120 held in the boundary data storage 120.)

In step 318, the upscaler 180 up-scales the first boundary data by multiplying each boundary data value by a scaling parameter. (It will be appreciated that this step may in some examples be omitted.) The updated boundary data is sent to the boundary data storage 120, which updates the memory elements 122a,b, 124a,b and 126a,b with the updated (second) boundary data values.

In step 320, the up-scaled process variable value and up-scaled boundary data values are received at the boundary re-calculator 190. Based on a comparison of the up-scaled process variable values and the up-scaled boundary data values and on stored rules, the boundary re-calculator determines whether a change in the boundary data is needed in view of the measured process variable and, if so, calculates what change is needed.

Determining whether, and if so by how much, any of the boundary data needs to be changed may be based on rules, which may be stored in the boundary re-calculator 190 or accessed from another memory location within the AHU controller 104, or which may be supplied by a user at the user interface 102. In examples, the rules may be provided in the form of hard wired logic gates or by series of computer-readable instructions.

In accordance with such rules or otherwise, the boundary re-calculator may, for example in response to determining that when the process variable, for example the evaporator supply temperature, is above a certain threshold, raise the upper A-only boundary so that a transition to the B-only mode is avoided, or raise the upper B-only mode should be raised so that a transition to the A&B mode is avoided, or lower the upper B-only boundary and the lower A&B boundary to reduce the likelihood of a transition occurring near the set-point. It will be appreciated that these are just some possibilities.

Another cycle of measuring the evaporator supply temperature and, if necessary, adjusting the configuration of the expansion valve arrangement 32 based on the measurement is then preformed similarly to steps 302 to 310 but using the second boundary data rather than the first boundary data.

In steps 322 and 324 comprise sensing a (new) evaporator supply temperature and calculating, with the PID loop controller 160, a new EDV based on the sensed temperature in the manner described for steps 302 and 304.

In step 326, the mode determiner 130 receives the (new) EDV from the PID loop controller 160, accesses the second boundary data held in the boundary data storage 120 and selects one of the three modes of operation based on the position of the EDV within the second boundary data. Rules determining the selection may be similar to those used for the selection in step 308 with the exception of using the second boundary data rather than the first boundary data.

Steps 326 to 330 then proceed similarly to steps 306 to 310 (where the step of accessing the updated boundary data in step 326 comprises accessing the second boundary data held in the boundary data storage 120).

The process then returns to step 312, and a "third pass" of the control process is performed by carrying out steps 312 to 330, where step 320 involves updating the second boundary data with third boundary data based on a new measurement of the process variable performed n step 312.

The processor may then run through further iterations of steps 312, each time with updated boundary data compared to the time before.

The rate of iterating steps 312 to 330 may, for example, be based on clock pulses of a clock of the AHU controller 104 or may or on a control algorithm or may be prompted by user a user commend received at the user interface 102.

The first boundary data may represent the theoretical relationship between the minimum and maximum capacity of the three modes of operation as a proportion of the maximum capacity of the whole evaporator (which corresponds to 100% usage of both coils).

In the case where coil A has a theoretical capacity equivalent to approximately to ⅓ (~33%) of the maximum evaporator capacity (100%) and coil B has a theoretical capacity equivalent to approximately to ⅔ (~66%) of the maximum evaporator capacity, the first boundary data may be as follows:

Lower boundary for A-only mode: 0%
Upper boundary for A-only mode: 33%
Lower boundary for B-only mode: 33%
Upper boundary for B-only mode: 66%
Lower boundary for A&B mode: 66%
Upper boundary for A&B mode: 100%

An illustration of this situation is shown in FIG. 6a.

The vertical axis of the graph in FIG. 6a shows the position of the first mode boundaries relative to the total evaporator demand (0-100%). The horizontal axis shows the supply temperature that would be expected to be observed based on in the absence of non-linearities. The region marked A indicates the range in which the mode determine 130 would, in this example, select the A-only mode, the region marked B indicates the range in which the mode determine 130 would, in this example, select the B-only mode, and the region marked A+B indicates the range in which the mode determine 130 would, in this example, select the A&B mode.

FIGS. 6b and 6c indicate that when the mode determiner 130 has selected the A-only mode, the coil usage determiner 140 determines a coil adjustment value for coil A in direct proportion to the increase in the evaporator demand, and similarly for coil B when in the B-only mode. When in the A&B mode, FIGS. 6b and 6c indicate that the coil usage determiner is programmed to determine that the use of coil B should be increased linearly up to the maximum capacity of coil B, and only then that coil A should be used to add a further adjustment.

FIG. 6d represents an example of updated, for example second, boundary data. In this example, it can be seen that the boundary selector 190 has moved the upper A-only boundary/lower B-only boundary towards the set-point and moved the upper B-only boundary/lower A&B boundary away from the set-point to define a wider band of operation for the B-only mode. FIGS. 6e and 6f indicate operation of the coil usage determiner 140 similar to that indicated by FIGS. 6a and 6b, but it will be appreciated that in other examples, the coil usage determiner 140 may be programmed to control adjustment of the usage of coils A and B in a manner which does not assume a direct relationship with the evaporator supply temperature, and which may use different ratios for the A and B coils in the A&B mode of operation.

It will be understood that although the illustrated embodiment shows an evaporator comprising two coils, the expansion valve/evaporator controller and evaporator control processes described herein could be used with a an evaporator having a different plural number of coils.

The invention claimed is:

1. An evaporator controller for a plural-coil evaporator of a refrigeration system, the evaporator controller comprising:
   a mode determiner for selecting a mode of operation of the evaporator from a plurality of modes of operation based on selection data and a refrigeration requirement, wherein one of the plurality of modes uses a first coil of the plurality of coils of the evaporator, another one of the plurality of modes uses a second coil of the plurality of coils of the evaporator, and at least one other of the plurality of modes uses more than one of the plurality of coils, and wherein the selection data comprises boundary data relating operational limits of each of the plurality of modes of operation to operational limits of the evaporator; and
   a selection data updater for updating the selection data based on the selected mode of operation and a process variable of the refrigeration system.

2. The evaporator controller of claim 1, wherein the mode determiner has selection logic defining at least one mode-selection rule for selecting the mode of operation.

3. The evaporator controller of claim 1, wherein the mode determiner is configured to access a value representing the process variable and to update the selection data to provide updated selection data based on the process variable value.

4. The evaporator controller of claim 1, wherein the process variable comprises at least one of: a rate of a change of evaporator demand, a theoretical duty of the evaporator, a measured duty of the evaporator, an evaporator supply temperature, a rate of change of the evaporator supply temperature, the evaporator supply temperature measured at a transition between modes of control, a superheat value, or a temperature of pressure associated with a compressor of the refrigeration system.

5. The evaporator controller of claim 1, wherein the process variable comprises a combination of the evaporator demand, evaporator supply temperature, and the evaporator supply temperature measured at a transition between different modes of control.

6. The evaporator controller of claim 1, wherein the selection data updater is configured to re-define selection data for at least one of the plurality of modes of operation.

7. The evaporator controller of claim 1, further comprising an up-scaler for up-scaling the selection data and up-scaling a process variable value and providing the up-scaled selection data and process variable value to the selection data updater.

8. The evaporator controller of claim 1, further comprising a PID loop controller for determining the refrigeration requirement by calculating an evaporator demand value based on an evaporator supply temperature and a set-point temperature.

9. The evaporator controller of claim 8, wherein the mode determiner is configured to access the selection data and to select the mode of operation based on the selection data and the evaporator demand value.

10. The evaporator controller of claim 8, further comprising a coil usage determiner for determining a coil usage requirement of a coil in the selected mode based on the selected mode and the evaporator demand value.

11. The evaporator controller of claim 10, further comprising a valve drive controller for controlling an expansion valve associated with the coil based on the coil usage requirement.

12. The evaporator controller of claim 8, further comprising a respective coil usage determiner for determining a coil usage requirement of a corresponding said coil in the selected mode based on the selected mode and the evaporator demand value.

13. The evaporator controller of claim 12, further comprising, for each coil, a valve drive controller for controlling an expansion valve associated with that coil based on its coil usage requirement.

14. The evaporator controller of claim 1, wherein the selection data updater has selection logic defining at least one selection data-update rule for re-defining the selection data.

15. The evaporator controller of claim 14, wherein the selection data-update rule dictates updating the selection data when the process variable is within a predetermined range to avoid selection of a different mode of operation within a predefined region of a set-point temperature.

16. An evaporator comprising:
   an expansion valve arrangement;
   a cooling coil arrangement comprising the plurality of coils; and
   the evaporator controller according to claim 1.

17. A refrigeration system (17) comprising:
   a compressor,
   a condenser, and
   the evaporator of claim 16.

18. A partial air cooling system (15) comprising:
   at least one cooling case,
   a supply air path,
   a return air path, and
   the refrigeration system of claim 17.

19. A method of controlling a plural-coil evaporator of a refrigeration system, the method comprising:
   selecting a mode of operation of the evaporator from a plurality of modes of operation, wherein one of the plurality of modes uses a first coil of the plurality of coils of the evaporator, another one of the plurality of modes uses a second coil of the plurality of coils of the evaporator, and at least one other of the plurality of modes uses more than one of the plurality of coils, wherein the mode of operation is selected based on selection data and a refrigeration requirement, and wherein the selection data comprises boundary data relating operational limits of each of the plurality of modes of operation to operational limits of the evaporator; and
   updating the selection data based on a process variable of the refrigeration system.

20. The method according to claim 19, wherein selecting the mode of operation is based on selection logic defining at least one mode-selection rule.

21. The method according to claim 19, further comprising the step of accessing the process variable and updating the selection data to provide updated selection data based on the process variable.

22. The method according to claim 19, wherein the process variable comprises at least one of a rate of a change of evaporator demand, a theoretical duty of the evaporator, a measured duty of the evaporator, an evaporator supply temperature, a rate of change of the evaporator supply temperature, the evaporator supply temperature measured at a transition between modes of control, a superheat value and a temperature of pressure associated with a compressor of the refrigeration system.

23. The method according to claim 19, wherein the process variable comprises a combination of the evaporator demand, evaporator supply temperature and the evaporator supply temperature measured at a transition between modes of control.

24. The method according to claim 19, wherein updating the selection data is based on selection logic defining at least one a selection data-update rule.

25. The method according to claim 19, wherein updating the selection data comprises up-scaling the selection data and up-scaling a value representing the process variable.

26. A computer product comprising a processor and at least one non-transitory computer-readable medium programmed with instructions to cause the processor to execute the method of claim 19.

27. A non-transitory computer medium carrying machine readable instructions for implementing the method of claim 19.

28. The method according to claim 19, further comprising the step of determining the refrigeration requirement based on an evaporator supply temperature and a set-point temperature.

29. The method according to claim 28, wherein determining the refrigeration requirement comprises determining an evaporator demand value using a PID loop controller taking the evaporator supply temperature and the set-point temperature as inputs.

30. The method according to claim 29, further comprising the step of accessing the selection data and selecting the mode of operation based on the selection data and the evaporator demand value.

31. The method according to claim 29, further comprising the step of determining a coil usage requirement based on the selected mode and the evaporator demand value.

32. The method according to claim 31, further comprising the step of controlling an expansion valve associated with a coil in the selected mode of operation based on the coil usage requirement.

33. The method according to claim 29, further comprising the step of determining a respective coil usage requirement of a corresponding said coil based on the selected mode and the evaporator demand value.

34. The method according to claim 33, further comprising the step of, for each coil, controlling an expansion valve associated with that coil in the selected mode of operation based on the coil usage requirement.

35. The method according to claim 29, further comprising the step of determining an evaporator demand value, accessing the updated selection data and selecting a mode of operation based on the updated selection data and evaporator demand value.

36. The method according to claim 19, wherein updating the selection data comprises re-defining selection data for at least one of the plurality of modes of operation.

37. The method according to claim 36, wherein the selection-update rule dictates updating the selection data when the process variable is within a predetermined range to avoid selection of a different mode of operation within a predefined region of the set-point temperature.

* * * * *